United States Patent [19]

Nhu

[11] Patent Number: 5,661,583
[45] Date of Patent: Aug. 26, 1997

[54] FIBER OPTICAL DATA INTERFACE SYSTEM

[75] Inventor: David H.C. Nhu, Potomac, Md.

[73] Assignee: The United States of America as represented by the Secretary of the Navy, Washington, D.C.

[21] Appl. No.: 551,725

[22] Filed: Oct. 25, 1995

[51] Int. Cl.$^6$ .............................. H04B 10/12; H04J 14/08
[52] U.S. Cl. ........................ 359/173; 359/119; 359/135; 375/257
[58] Field of Search .......................... 359/118–119, 127, 359/135, 137, 173; 375/257, 260; 341/50, 100; 370/452

[56] References Cited

U.S. PATENT DOCUMENTS

| | | | |
|---|---|---|---|
| 4,350,973 | 9/1982 | Petryk, Jr. ........................ | 359/173 |
| 4,654,844 | 3/1987 | Mandello .......................... | 359/181 |
| 4,933,929 | 6/1990 | Tajima ............................. | 370/3 |
| 4,945,806 | 8/1990 | Merrill ............................ | 250/227.11 |
| 4,953,156 | 8/1990 | Olshansky et al. ................ | 370/3 |
| 4,989,935 | 2/1991 | Stein .............................. | 350/96.11 |
| 5,007,697 | 4/1991 | Chadha ............................ | 350/96.15 |
| 5,026,134 | 6/1991 | Sugawara et al. ................. | 350/96.11 |
| 5,315,424 | 5/1994 | Roden et al. ..................... | 359/118 |

*Primary Examiner*—Kinfe-Michael Negash
*Attorney, Agent, or Firm*—James B. Bechtel, Esq.

[57] ABSTRACT

A coupler device is disclosed that establishes an optical link between electrical equipment operated in accordance with a protocol defined by the requirements of a Navy Tactical Data System. The coupler device provides for the optical link which is beneficial in many military applications and that rids associated communication network of heavy and costly copper or coaxial cables, allowing the replacement thereof with the less expensive and lighter fiber optic cables.

9 Claims, 8 Drawing Sheets

FIBER OPTICAL DATA INTERFACE SYSTEM

STATEMENT OF GOVERNMENT INTEREST

The invention described herein may be manufactured and used by or for the Government of the United States of America, for governmental purposes, without the payment of any royalty thereon or therefor.

BACKGROUND OF THE INVENTION

The present invention relates to a coupler device and, more particularly, to a coupler device having driver circuits serving as transmitters and receivers which can convert digital electrical signals to optical signals and optical signals to digital electrical signals, respectively, so as to provide for optical communications between first and second digital equipment.

Communication networks that employ optical fibers are the technology of choice because they are capable of transmitting billions of bits of information per second and, unlike communication networks employing electrical cables that transfer electrical pulses, the optical fibers transmit light pulses representative of these bits that are not affected by random radiation in the environment. Further, the optical fibers are lightweight and relatively inexpensive as compared to coaxial and copper cables used in previous communication networks.

The coaxial and copper cables that interconnect electronic gear forming communication networks are relatively heavy which not only hinder their initial installation but also remain an operating drawback. For example, on a modern warship fully equipped with computers and other electronic gear which forms a communication network, the coaxial and copper cables alone can weigh up to 80 tons which may correspond to about one percent of the ship's total weight. The replacement of these coaxial and copper cables with fiber optical cables not only reduces the attendant weight, but also improves the transmission characteristics of the related communication network so that it is free from electromagnetic interference (EMI) and radio frequency interference (RFI) drawbacks.

Although optical communications between digital equipment such as computers, is desired, existing interfaces do not lend themselves to such a communication technique. More particularly, communication networks that include computers found in military installations employ a NTDS protocol which comprises a parallel transmission technique conforming to military specification, such as Military Standard, Input/Output Interfaces, Standard Digital Data, Navy System, MIL-STD-1397B (NAVY), herein incorporated by reference and which describes the parameters of digital data interfaces, such as the Navy Tactical Data System (NTDS) which is of particular importance to the present invention.

The NTDS interfaces have a specified protocol that includes not only parallel transmission techniques, but also a set of hardware logic levels for each bit of data that is transferred between digital equipment. Conversely, the optical communications commonly employ serial transmissions technique. The serial transmission technique allows all related data to be conveyed on one fiber optic, whereas the parallel transmission technique requires a separate conveyance path for each line of the parallel group of data. If a parallel transmission technique was used in an optical communication network, it would disadvantageously increase the cost by requiring separate fiber optics for each parallel bit. Further, the hardware protocol that accompanies the optical transmission commonly comprises emitter coupled logic (ECL), whereas the hardware that accompanies the NTDS protocol disadvantageously comprises logic levels that are different from the emitter coupled logic. Accordingly, although the optical communication network may be the technology of choice for military as well as commercial applications, the existing military technology, in particular, the NTDS protocol used in military applications hinders its acceptance. It is desired that means be provided to allow for the military digital equipment employing NTDS protocol to be adapted to provide for optical communication between the various digital equipment.

SUMMARY OF THE INVENTION

The present invention is directed to a coupler device that is easily connected to digital equipment and which converts digital electrical signals, defined by a NTDS protocol, to optical signals for transmission and reception by optical fiber cables comprising an optical communication network.

The coupler device houses driver circuitry that generates visual output signals in response to signals derived from a NTDS protocol and, conversely, receiver circuitry that generates NTDS protocol signals derived from visual input signals. The combined circuitry provides optical communications between first and second digital equipment each operated under a NTDS protocol with signals thereof made available at a first connector of each first and second digital equipment. The coupler device comprises first and second means for connecting and an optical fiber. The first means for connecting is connected to the first connector at the first digital equipment. The first means for connecting routes input signals defined by the NTDS protocol to the housed circuitry which, in turn, generates the visual output signals. The optical fiber cable has a first end for receiving the visual output light signals and a second end making available the visual output signals. The second means is connected to the first connector of the second digital equipment and receives the visual output signals that are made available and routes these visual output signals to the circuitry of the coupler device which, in turn, generates NTDS protocol signals that are delivered to the first connector of the second digital equipment.

Accordingly, it is a primary object of the present invention to provide a coupler that converts signals defined by a NTDS protocol to visual signals that are delivered to optical fibers for transmission and reception thereof.

It is a further object of the present invention to provide a coupler device that receives the signals defined by the NTDS protocol and converts those signals to corresponding signals defined as a transistor-transistor-logic (TTL) hardware protocol which, in turn, are converted to signals defined by an emitter-coupled-logic (ECL) hardware protocol so as to be capable of being switched at high speeds to accommodate the needs of an optical communication network.

It is another object of the present invention to provide for various embodiments of coupler devices that accommodates various connector arrangements found on digital equipment utilizing signals defined by a NTDS protocol.

Other objects, advantages and novel features of the invention will become apparent from the following detailed description when considered in conjunction with the accompanying drawings therein.

DETAILED DESCRIPTION OF THE PREFERRED EMBODIMENTS

Figure 1:
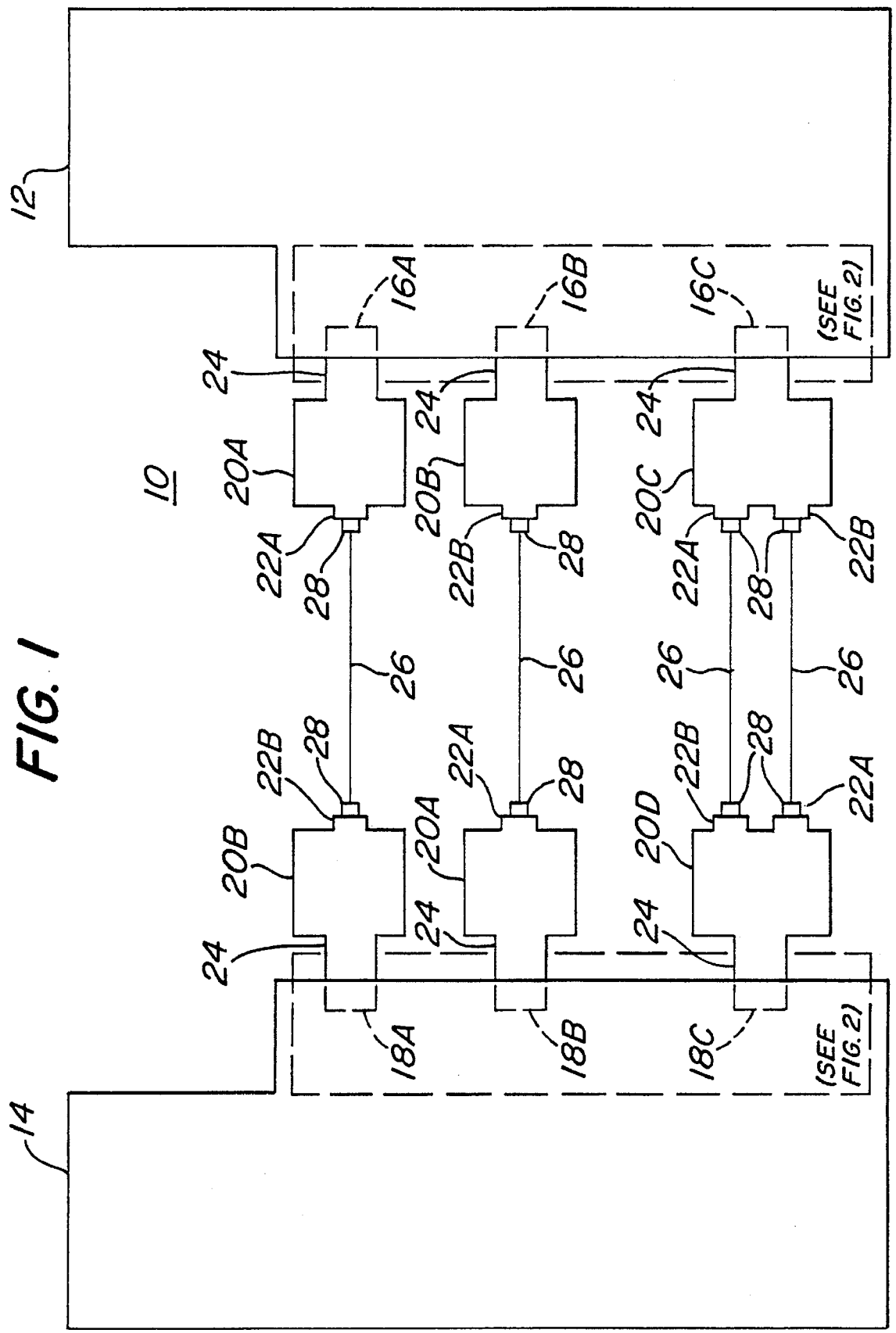
FIG. 1 illustrates various embodiments of the coupler device of the present invention interconnecting first and second digital equipment.

Referring now to the drawings, wherein the same reference numbers indicate the same elements throughout, there is shown in FIG. 1 a coupling arrangement 10 of the present invention for interconnecting first (#1) and second (#2) digital equipment 12 and 14. The first digital equipment 12 has electrical connectors 16A, 16B and 16C, whereas the second digital equipment has electrical connectors 18A, 18B and 18C. The connectors 16A, 16B, 16C, 18A, 18B and 18C provide appropriate signals for either an input or output port or both, to be further described, for the digital equipment 12 or 14. Further, the connectors 16A, 16B, 16C, 18A, 18B and 18C may be interchangeably referred to herein as an input or output port of a computer, such as, digital equipment 12 and 14.

The digital equipment 12 and 14 may be general purpose computers, each operating in accordance to a NTDS protocol that includes both hardware and software requirements all of which are defined in the previously incorporated by reference MIL-STD-1397B.

The computers 12 and 14, operating in accordance with the NTDS protocol, provide for simultaneous and parallel transmission of all bits in a multi-bit word over individual lines that are made available at connectors, such as connectors 16A, 16B, 16C, 18A, 18B and 18C. This parallel operation of transferring data is not desired for an optical link which normally requires a serial transmission to propagate information along a single path in which the data bits, represented by light pulses, are sent one after the other. The conversion of the NTDS protocol having a parallel operation to that desired for the optical fiber link using a serial transmission is accomplished by the coupling arrangement 10 comprising coupler devices 20A, 20B, 20C and 20D, each having an input/output stage 22A and/or an output/input stage 22B whose interconnections to either an input or output data port, related to connectors 16A, 16B, 16C, 18A, 18B and 18C, are illustrated in FIG. 1 and are tabulated in Table 1.

TABLE 1

| CONNECTOR | INPUT/OUTPUT PORT | COUPLER DEVICE | INPUT/OUTPUT STAGE |
|---|---|---|---|
| 16A | Input | 20A | 22A |
| 16B | Output | 20B | 22B |
| 16C | Input and Output | 20C | 22A and 22B |
| 18A | Output | 20B | 22B |
| 18B | Input | 20A | 22A |
| 18C | Input and Output | 20D | 22A and 22B |

Each of the coupler devices 20A, 20B, 20C and 20D houses driver and/or receiver circuitry, to be further described with reference to FIGS. 3–8, that generates visual output signals in response to signals defined by the NTDS protocol and, conversely, generates NTDS output signals derived from visual input signals. The combined circuitry provides an optical communication link between the computers 12 and 14.

Each of the coupler devices 20A, 20B, 20C, and 20D has a connector 24, to be further described with reference to FIG. 2, that mates with any of the connectors 16A, 16B, 16C, 18A, 18B and 18C, also to be further described with reference to FIG. 2, of computers 12 and 14. The respectively mated connectors are interconnected to each other by means of a conventional fiber optic cable 26 that is mated to the respective coupler device 20A, 20B, 20C, or 20D by a conventional optical connector 28. All of the coupler devices 20A, 20B, 20C and 20D are quite similar to each other with the only difference being the location of the input/output stage 22A and output/input 22B stage on the coupler and how many stages 22A and 22B that the coupler device carries. Further, coupler devices 20C and 20D only differ from each other in the up/down orientation (as viewed in FIG. 1) of the stages 22A and 22B. The stages 22A and 22B, dependent upon the arrangement of the associated coupler device 20A, 20B, 20C or 20D, may be either an input stage, commonly referred to as a receiver, to receive data or an output stage, commonly referred to as a driver, to transmit data, but stage 22A is commonly used as an input stage and is so termed herein as input/output stage, whereas stage 22B is commonly used as an output stage and so termed herein as output/input stage. Further details of the coupler devices 20A, 20B, 20C and 20D may be further described with reference to FIG. 2.

Figure 2:
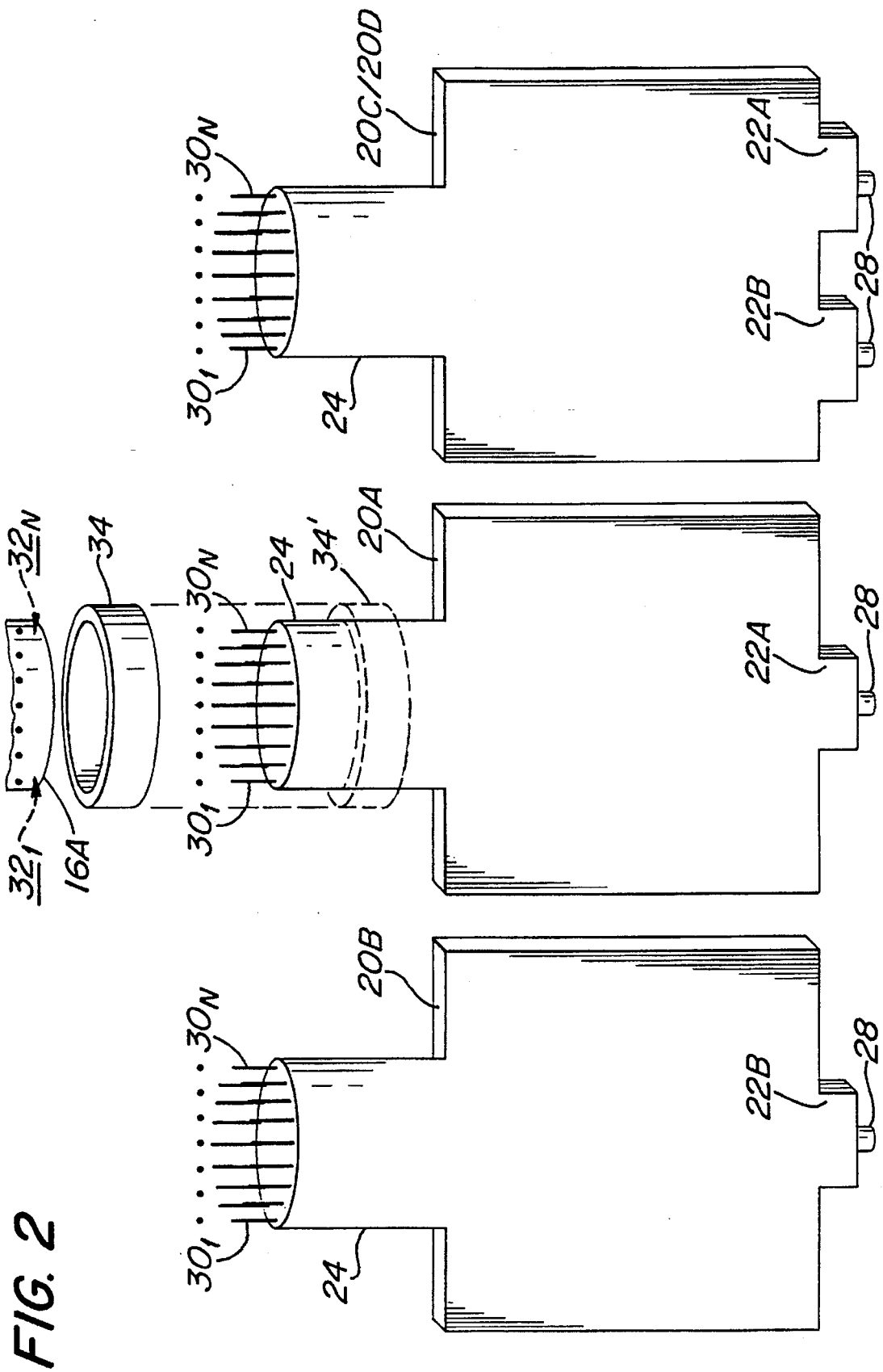
FIG. 2 is a schematic generally illustrating the interconnection between the coupler device of the present invention and a connector of a first digital equipment.

FIG. 2 generally illustrates the physical features of the connectors 20A and 20B and also those of 20C/20D. FIG. 2 further illustrates the connector 24 for each of the couplers 20A, 20B, 20C/20D which is an NTDS round connector of the male type having the characteristics defined by the General Specifications for Cable, Electrical, Lightweight for Shipboard use, MIL-C-2460, dated Aug. 10, 1984 and Advanced Marine Cable (AMC) Specification PNS-400800/163 dated Sep. 22, 1982, both of which specifications are herein incorporated by reference. Each of the male connectors 24 has pins $30_1 \ldots 30_N$ upwardly extending therefrom as shown in FIG. 2.

FIG. 2, in particular the central portion thereof, generally illustrates the connector 16A which is also of a NTDS round type, but of the female type and has a plurality of pin sockets (not shown) $32_1 \ldots 32_N$. As known in the art, the female pin sockets $32_1 \ldots 32_N$ have complementary dimensions to respectively accommodate the insertion of the male pin $30_1 \ldots 30_N$. The other connectors 16B, 16C, 18A, 18B and 18C of FIG. 1 are similar to connector 16A shown in FIG. 2. Also shown in FIG. 2, is a ring device 34 that assists in the connection between the round male connector 24 and the round female connector 16A.

In operation, the ring device 34 is first slid down on the outside of the round connector 24, as indicated in FIG. 2 by the representation 34', then the pins $30_1 \ldots 30_N$ are respectively inserted into their mating sockets $32_1 \ldots 32_N$. After such insertion, the round male connector 24 is further pushed into the female connector 16A, and then, the ring device 34 is positioned so as to straddle both and press against both the male connector 24 and the female connector 16A. Although, the connector 24 has been described as being a male type and the connector 16A has been described as being a female type, the practice of this invention contemplates reversal of this arrangement so as to accommodate a female connector 24 and a male connector 16A.

The operation of the present invention may be further described with reference back to FIG. 1, where as seen in FIG. 1, for example, the coupler devices 20A and 20B interconnect the output port 18A of computer 14 to an input port 16A of computer 12. Other interconnections between computers 12 and 14, established by coupler devices 20A, 20B, 20C and 20D, are as shown in FIG. 1 and their method of operation is the same as to be described for coupler devices 20A and 20B. The coupler device 20B serves as a first means for connecting to the output port 18A of computer 14 and handles the digital data generated by computer 14 and defined by the NTDS protocol as input signals and routes such signals to the converting circuitry of FIGS. 3-8, to be described, which, in turn, provides for visual output light signals that are made available at the output/input stage 22B of the coupler device 20B. The visual output light signals are applied to the fiber optic cable 26, having a first end receiving the visual output signals and a second end making the visual output signals available to and connecting such, via optical connector 28, to the input/output 22A stage of the coupler device 20A connected to computer 12, via input port 16A. The coupler device 20A serves as a second means for receiving visual output signals and routing them to the converting circuitry of FIGS. 3-8 housed therein which, in turn, provides first protocol signals, that is, the signals defined by the NTDS protocol. The NTDS protocol signals are output signals of the coupler device 20A which are derived from the signals appearing at the input/output stage 22A of coupler device 20A. These NTDS signals are delivered to the input port 16A of the computer 12. The operation of the circuitry housed in each of coupler devices 20A, 20B, 20C, and 20D may be further described with reference to FIGS. 3, 4, 5 and 6.

FIGS. 3, 4, 5, and 6 respectively illustrate the conversion circuits for conversion from the hardware protocols of Navy Tactical Data System (NTDS) to Transistor-Transistor Logic (TTL); Transistor-Transistor Logic (TTL) to Emitter Coupled Logic (ECL); Emitter Coupled Logic (ECL) to Transistor-Transistor Logic (TTL); and Transistor-Transistor Logic (TTL) to Navy Tactical Data System (NTDS). The series of protocols conversions are desired so that the first protocol (NTDS) may be transitioned into the second protocol (TTL) to allow it to be more readily transitioned into the third protocol (ECL). The ECL protocol is particularly advantageous to use in optical communication networks because of its inherent speed and performance. The speed of ECL devices results from the fact that ECL gates inherently operate in a non-saturated state. Thus, the propagation delay is low in comparison with other conventional protocols. Before and after the ECL protocol is used to transfer information in the optical link of the present invention, it is desired to transition the protocol to the TTL protocol because the TTL protocol is quite popular in various integrated circuit technologies, allowing the present invention to make use of these readily available circuits and, thus, reducing the attendant cost of implementing the invention.

Figure 3:
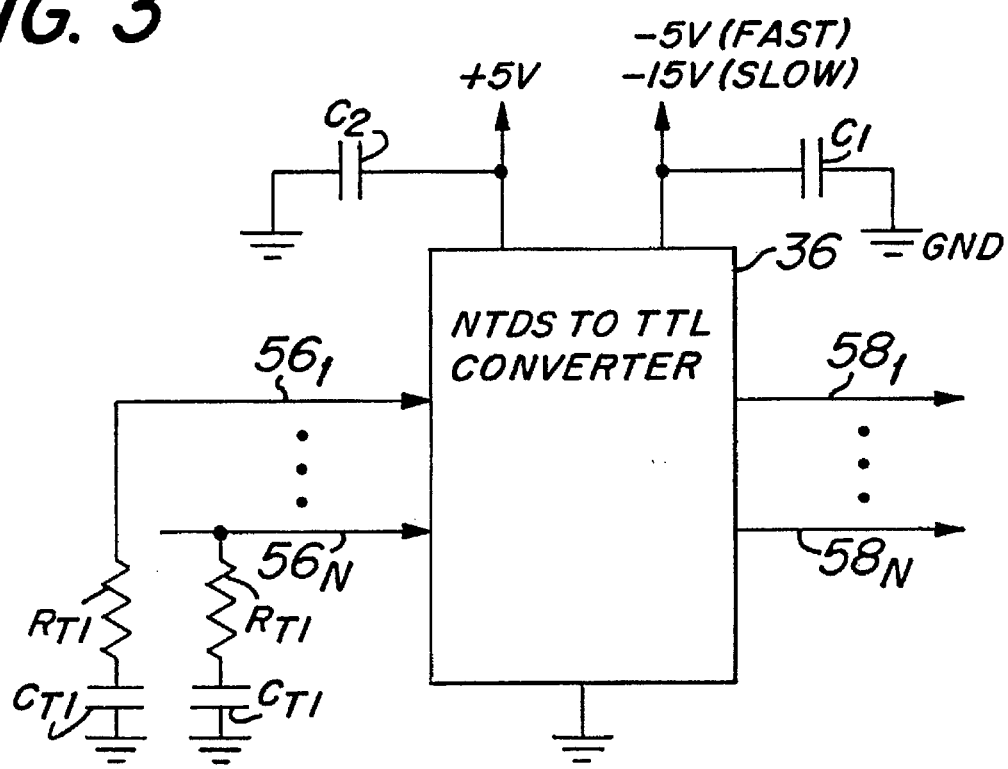
FIG. 3 is a schematic of one stage for converting NTDS logic levels to TTL logic levels.

FIG. 3 illustrates the NTDS to TTL converter 36 as the interface device between NTDS data on signal paths $56_1 \ldots 56_N$ (to be described) and TTL data on signal paths $58_1 \ldots 58_N$ (to be described). The NTDS to TTL converter 36 is known in the art, and converts the NTDS logic levels of the input signals −5.0 V (d.c.) (NTDS fast) and −15.0 V (d.c.) (NTDS slow) to the TTL logic level +5.0 V (d.c.). The −5.0 V (d.c.) level is applicable when the NTDS hardware protocol is assigned as NTDS fast and, conversely the −15.0 V (d.c.) is applicable when the NTDS protocol is assigned NTDS slow. The NTDS source (−5.0 V d.c. or −15 V d.c.) is preferably decoupled from ground by means of a capacitor $C_1$ having a typical value of 0.1 µf, and similarly, the TTL source (+5.0 V d.c.) is preferably decoupled from ground by means of a capacitor $C_2$ having a typical value of 0.1 µf. Each of the signal paths $56_1 \ldots 56_N$ is preferably terminated with a resistive-capacitive series arrangement of $R_{T1}$ and $C_{T1}$ having typical values in the ranges of 150 to 180 ohms and 0.068 to 0.01 µf respectively.

Figure 4:
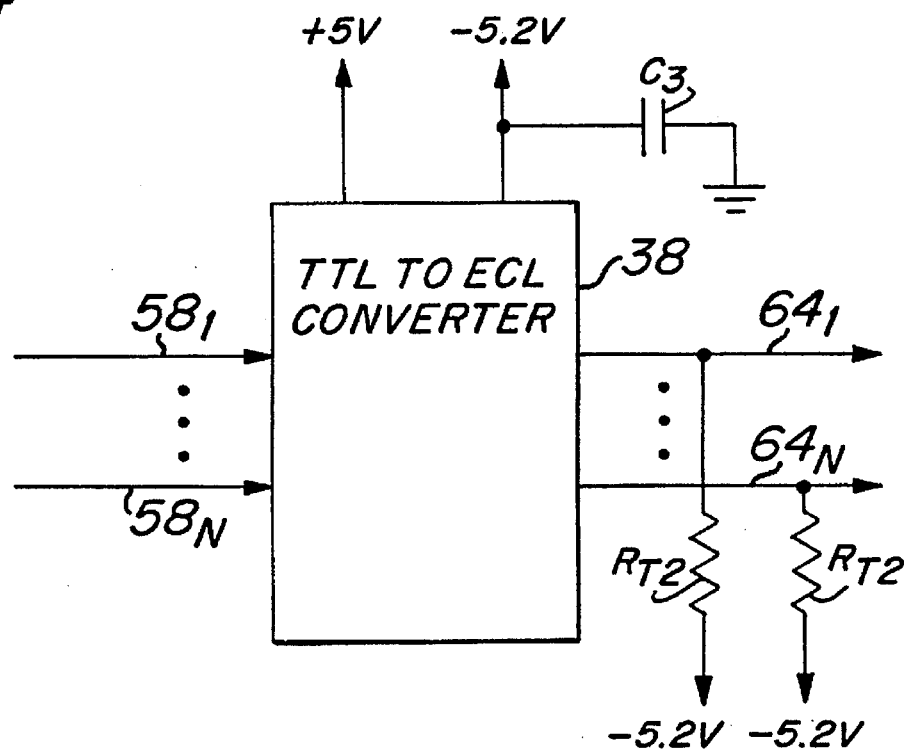
FIG. 4 is a schematic of one stage for converting TTL logic levels to ECL logic levels.

FIG. 4 illustrates the TTL to ECL converter 38 as the interface device between the TTL data on signal paths $58_1 \ldots 58_N$ and ECL data on signal paths $64_1 \ldots 64_N$ (to be described). The TTL to ECL converter 38 is known in the art, and converts the TTL logic level (+5.0 V (d.c.)) of the input signals to the ECL logic level (−5.2 V (d.c.)). The ECL source (−5.2 V (d.c.)) is preferably decoupled from ground by means of a capacitor $C_3$ having a typical value of 0.1 µf. Each of the signal paths $64_1 \ldots 64_N$ is preferably terminated with a resistor $R_{T2}$, arranged as shown, and having a typical value in the range of 50 to 2000 ohms and coupled to the ECL source (−5.2 V (d.c.)).

Figure 5:
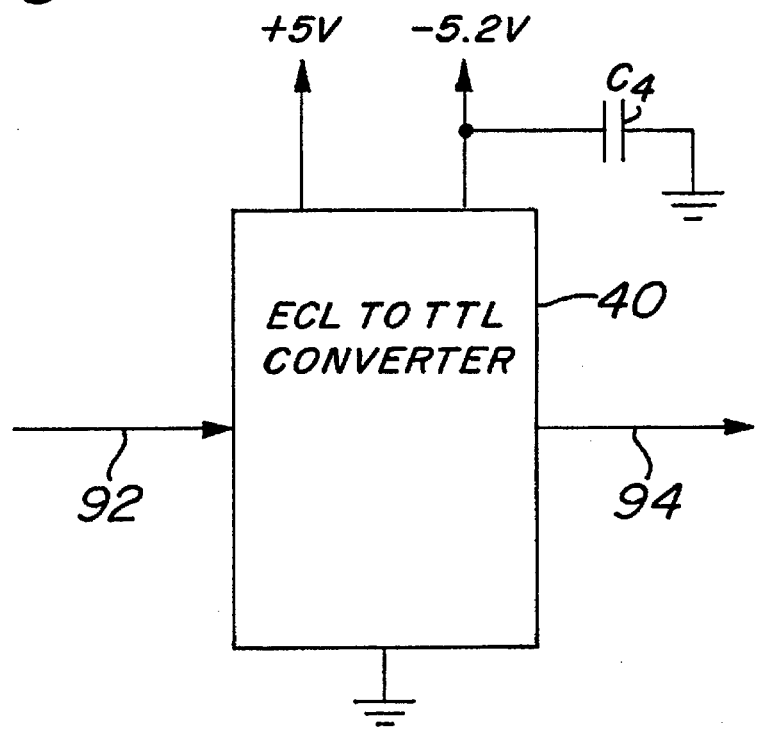
FIG. 5 is a schematic of one stage for converting ECL logic levels to TTL logic levels.

FIG. 5 illustrates the ECL to TTL converter 40 as the interface device between ECL data on signal path 92 (to be described) and the TTL data on signal path 94 (to be described). The ECL to TTL converter 40 is known in the art, and converts the ECL logic levels (−5.2 V (d.c.)) of the input signals to the TTL logic level (+5.0 V (d.c.)). The ECL source (−5.2 V (d.c.)) is preferably decoupled from ground by means of a capacitor $C_4$ having a typical value of 0.1 µf.

Figure 6:
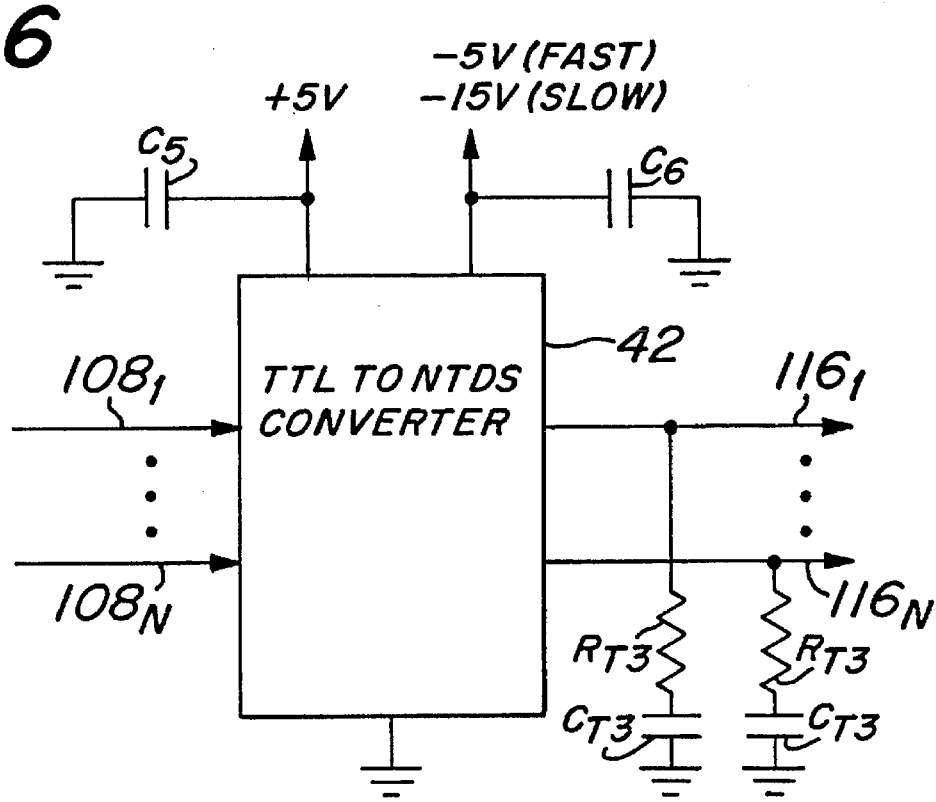
FIG. 6 is a schematic of one stage for converting TTL logic levels to NTDS logic levels.

FIG. 6 illustrates the TTL to NTDS converter 42 as the interface device between the TTL data on signal paths $108_1 \ldots 108_N$ (to be described) and the NTDS data on signal paths $116_1 \ldots 116_N$ (to be described). The TTL to NTDS converter 42 is known in the art, and converts the TTL logic levels (+5.0 V (d.c.)) to the NTDS logic levels (−5.0 V (d.c.) (NTDS fast) and −15.0 V (d.c.) (NTDS slow)). The TTL source (+5.0 V (d.c.)) is preferably decoupled from ground by means of a capacitor $C_5$ having a typical value of 0.1 µf, and similarly, the NTDS source (−5.0 V (d.c.) and −15 V (d.c.)) is decoupled from the ground by capacitor $C_6$ having a typical value of 0.1 µf. Each of the signal paths $116_1 \ldots 116_N$ is preferably terminated with a resistive-capacitive series arrangement of $R_{T3}$ and $C_{T3}$ having typical values in the range of 150 to 180 ohms and 0.068 to 0.001 µf respectively. In general, and with general reference to FIGS. 7 and 8, conversion circuitry (embodying the converters of FIGS. 3-6) senses the NTDS data stream flowing from an NTDS computer 12 or 14 and converts this stream into a TTL data stream by means of the NTDS to TTL converting circuit 36 of FIG. 3 and which stream, in turn, is converted into an ECL data stream by a TTL to ECL converting circuit 38 of FIG. 4 for transmittal by the optical fiber 26 of the related coupler device 20A, 20B, 20C or 20D. The conversion circuit 40 accepts the ECL data stream and converts it into a TTL data stream that is eventually routed to conversion circuit 42 which converts the TTL data stream back to its original NTDS data stream format. The conversion circuits 36 and 38 form part of the input/output stage 22A of FIG. 7, whereas the conversion circuits 40 and 42 form part of the output/input stage 22B of FIG. 8. The input/output stage 22A, in addition to conversion circuit 36 and 38, further comprises circuit functional elements given in Table 2.

TABLE 2

| REFERENCE NO. | ELEMENT |
| --- | --- |
| 48 | THIRD CONVERTER |
| 50 | MULTIPLEXER AND MANCHESTER ENCODER |
| 52 | SIGNAL PROCESSOR |
| 54 | LED TRANSMITTER (TX) |

Figure 7:
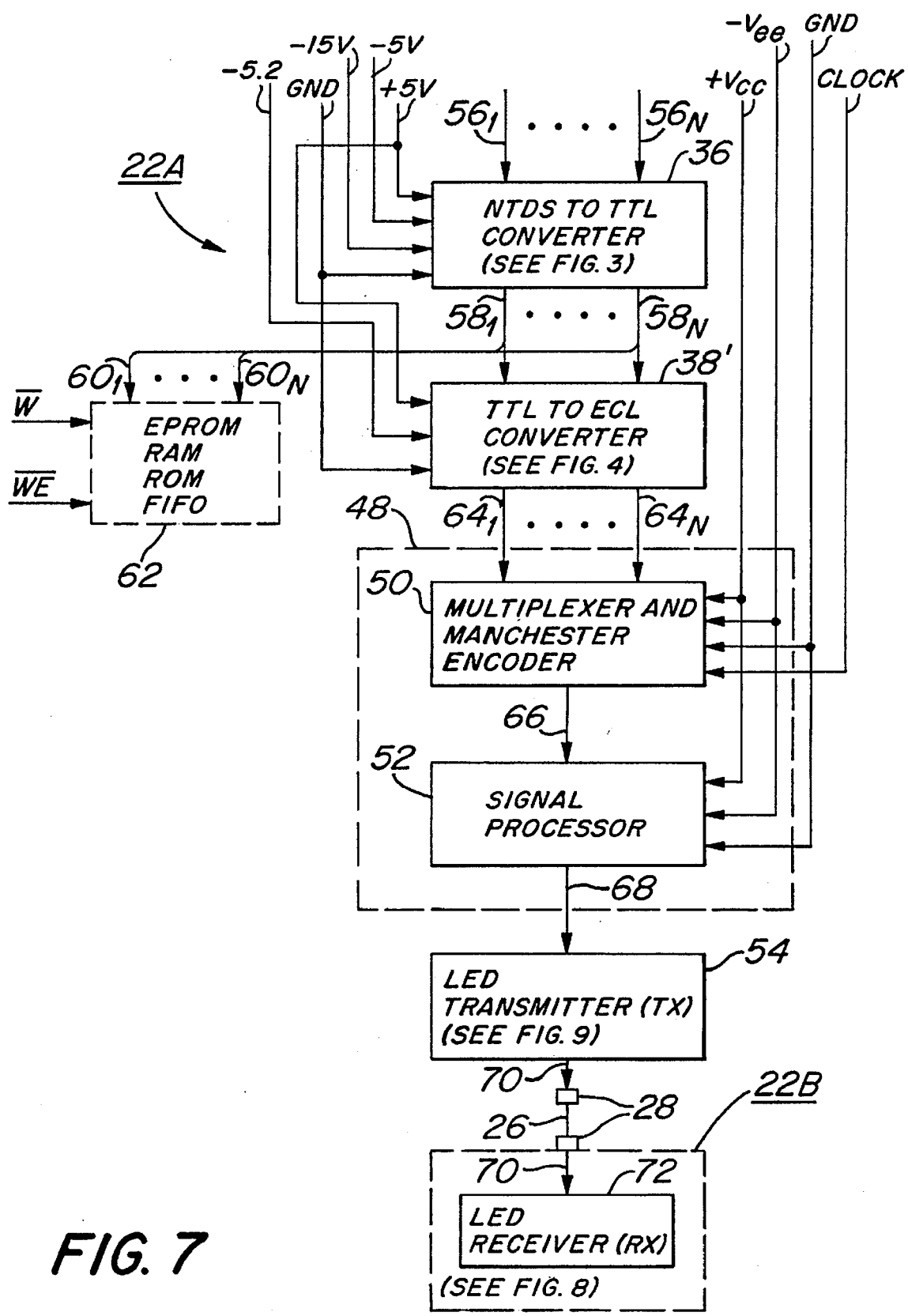
FIG. 7 is a block diagram of the input/output stage of the circuitry carried by the coupler device of the present invention.
Figure 8:
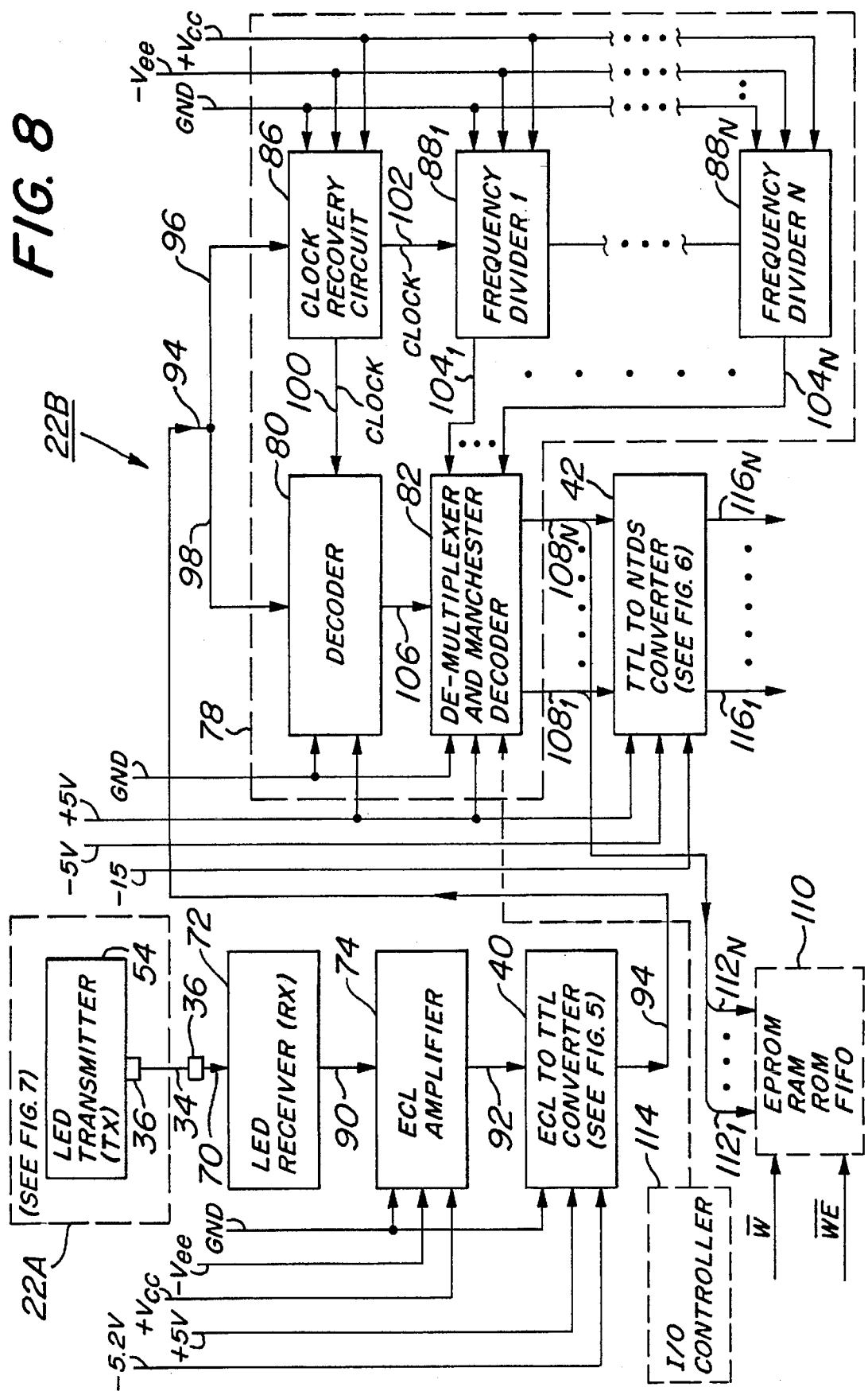
FIG. 8 is a block diagram of the output/input stage of the circuitry carried by the coupler device of the present invention.

FIG. 7, as well as FIG. 8, illustrates the interrelationship between three different logic types. More particularly, between (1) a first set of logic levels related to a first protocol, that is, the NTDS protocol, (2) the logic levels related to a second protocol, that is, the transistor-transistor-logic and (2) the logic levels related to a third protocol, that is, the emitter coupled logic (ECL). The logic levels related to the three protocols along with an external clock and connected to and supplying the various elements shown in FIGS. 7 and 8 are tabulated in Table 3.

TABLE 3

| SUPPLY PARAMETERS |
| --- |
| −15 VOLTS) (d.c.) |
| −5 VOLTS (d.c.) |
| −V$_{ee}$ (−5.2 VOLTS) (d.c.) |
| −5.2 VOLTS (d.c.) |
| +5 VOLTS (d.c.) |
| +V$_{cc}$ 0 VOLT (d.c.) or +5 VOLTS (d.c.) |
| GND (Ground) |
| CLOCK |

In operation, and with reference to FIG. 7, the NTDS to TTL converter 36 receives the NTDS stream of data from either computer or 14, dependent upon where the coupler device 20A, 20B, 20C or 20D carrying the input/output stage 22A is arranged. The NTDS data are received on two or more data lines $56_1 \ldots 56_N$ and the NTDS to TTL converter 36 converts such into a TTL data stream which is present on the two or more data lines $58_1 \ldots 58_N$. If desired, the TTL data stream, defined by a second set of logic levels corresponding to the TTL protocol, may be routed, via data lines $60_1 \ldots 60_N$, to a storage element 62 that may be selected from any one of electrically programmable read only memory (EPROM), a random access memory (RAM), a read only memory (RAM) and a first-in, a first-output (FIFO) read only register. Any of the storage element 62 is responsive to the signals write-not and write-enable-not.

The TTL data lines $58_1 \ldots 58_N$ are applied to the TTL to ECL converter 38 which, in turn, provides for an ECL data stream that is present on two or more signal paths $64_1 \ldots 64_N$ that are routed to a third converter 48, in particular, to the multiplexer and manchester encoder 50 of the third converter 48 which produces an output signal comprised of a composite manchester coded message having a clock embedded therein. The multiplexer and manchester encoder both of element 50 operate in series and in a manner known in the art. The multiplexer receives the TTL coded output present on the two or more lines $64_1 \ldots 64_N$ and places the data therein onto a single line serving as an output of the multiplexer which is routed to the manchester encoder. The manchester encoder receives the serial output from the multiplexer and provides, in a manner known in the art, a signal comprising the composite manchester coded message having a clock embedded therein. The output of the encoder is directed onto signal path 66 which is routed to the signal processor 52.

The signal processor 52, in a manner known in the art, receives the composite output signal, carrying the manchester coded message having the clock signal embedded therein, and provides a time division multiplexed output on signal path 68 which is routed to the LED transmitter (TX) 54.

The LED transmitter (TX) 54 preferably comprises a light emitting diode which converts the sequentially occurring serial data on signal path 68 into corresponding visible light which is applied to the optical connector 28 which, in turn, is connected to first end of the optical fiber 26 which, in turn, has a second end making available and connecting the visible output light signals present on signal path 70 to the output/input stage 22B that may be described with reference to FIG. 8 comprising a plurality of circuit functional elements given in Table 4.

TABLE 4

| REFERENCE NO. | ELEMENT |
| --- | --- |
| 72 | LED RECEIVER (RX) |
| 74 | ECL AMPLIFIER |
| 40 | ECL TO TTL CONVERTER |
| 78 | FIFTH CONVERTER |
| 80 | DECODER |
| 82 | DE-MULTIPLEXER AND MANCHESTER DECODER |
| 42 | TTL TO NTDS CONVERTER |
| 86 | CLOCK RECOVERY CIRCUIT |
| $88_1$ | FREQUENCY DIVIDER 1 |
| . | . |
| . | . |
| . | . |
| $88_N$ | FREQUENCY DIVIDER N |

The LED receiver (RX) 72 preferably comprises a light emitting diode that is responsive to the visible light contained in the sequential data on the signal path 70. The LED receiver, in response to light signal on signal path 70, produces serially occurring electrical signals having logic levels that correspond to those of the emitter coupled logic (ECL) which are preferably routed on signal path 90 to an ECL amplifier 74.

The ECL amplifier 74 acts to increase the magnitude of the sequential data on signal path 90. It is preferred that the ECL amplifier 74 be interposed between the LED receiver (RX) 72 and the ECL to TTL converter 40 so as to provide for a relatively clean signal at a high enough amplitude that makes it amenable for further processing by the fifth converter 78. Further, the output of the LED receiver (RX) 72 may be relatively small and any noise on this relatively small signal may disadvantageously corrupt the signal, thereby, hindering its further processing. To avoid this corruption, several precautions may be taken, such as, the use of a power supply filter and other noise reducing techniques. For example, the ECL amplifier 74 receiving the output of the LED receiver 72 may typically comprise three stages each of which amplifies and squares its received input waveform before it is coupled to the next stage thereof. The clean and amplified signals provided by the ECL amplifier 74, occurring in a serial manner, are routed to the ECL to TTL converter 40 by means of signal path 92.

The ECL to TTL converter 40 converts the signals present on signal path 92 having the third set of logic levels into signals defined by the second set of logic levels corresponding to the TTL protocol. The TTL defined signals are placed on signal path 94 which, in turn, is separated into two paths 96 and 98 that are respectively connected to the clock recovery circuit 86 and the decoder 80.

The clock recovery circuit 86 recovers the clock embedded in the manchester encoded message present on signal path 96. The use of the embedded clock signal is preferred because it avoids the use of a relatively expensive phase-clock loop recovery method, known in the art, that is normally used to provide synchronization between the transmitter device, such as input/output stage 22A and a receiving device, such as output/input stage 22B. The clock recovery circuit 86 routes its recovered clock to decoder 80 via signal path 100 and to frequency divider 1 ($88_1$) via signal path 102. The frequency dividers $88_1$ ... $88_N$ provide timing signals to the de-multiplexer and manchester decoder 82 of the fifth converter 78 via signal paths $104_1$ ... $104_N$.

The decoder 80 decodes the data stream on signal path 98 by sampling data, in a manner known in the art, in the appropriate half of the data bit information. As is known, manchester data encodes a zero (0) as a zero in the first half of the bit and as a one (1) in the second half of the bit. If the encoded data is sampled in the first half of the bit, the output will be a non-return-to-zero serial data stream of the correct polarity.

The decoder 80 in cooperation with the de-multiplexer and manchester decoder 82 converts the coded sequential data, carried on the signal path 98, into decoded sequential data carried on signal path 106 and then into parallel data carried on paths $108_1$ ... $108_N$ that are eventually converted to parallel data defined by the NTDS protocol. The decoder 80 decodes the data on signal path 98 into corresponding serial data which are applied to signal path 106. The data stream present on signal path 106 is applied to be de-multiplexer of element 82. The de-multiplexing operation is simply a reversal of the multiplexing process of the third converter 48 already described with reference to FIG. 7. More particularly, the de-multiplexer of element 82 receives the time division multiplexed output provided by the signal processor 52 of FIG. 7 and converts this time division multiplex output into a composite manchester coded message, and routes such a composite message to manchester decoder of element 82.

In general, the de-multiplexer and manchester decoder 82 receives the coded serial output on signal path 106 from decoder 80 and converts it into a parallel output carried by two or more lines $108_1$ ... $108_N$ that are routed to the TTL to NTDS converter 42 and, also preferably, to the storage element 110, via signal path $112_1$ ... $112_N$. The storage element 110, like element 62 of FIG. 7, may be of the type selected from one of the electrically programmable read only memory (EPROM), a random access memory (RAM), a read only memory (ROM) and a first-in, first-out (FIFO) register. Similarly, the storage element 110 is responsive to the write-not and write-enable-not.

The time separation between the information present on signal paths $108_1$ ... $108_N$ is established by the clock recovered by the clock recovery circuit 86 and by the frequency dividers $88_1$ ... $88_N$ each of which provides a timing signal respectively present on signal paths $104_1$ ... $104_N$. More particularly, in order to ensure synchronization of the time division multiplexed information provided by signal processor 52 and generated by the input/output stage 22A and the information present on signal path $108_1$ ... $108_N$ and received by the output/input stage 22B, the outputs of demultiplexer and manchester decoder 82 are gated by series of flip-flops clocked at a megacycle (MHz) timing signal established by the frequency dividers $88_1$ ... $88_N$. It should be noted that frequency dividers $88_1$ ... $88_N$ operate in response to the clock embedded in the transmitted manchester message on signal path 96 as does the LED transmitter (TX) 54 and, thus, synchronization therebetween is achieved. The information present on signal path $108_1$ ... $108_N$ is routed to the TTL to NTDS converting circuit 42 which, in turn, provides for an NTDS protocol signals that are routed to the NTDS computer 12 or 14 previously described with reference to FIG. 1.

Figure 9:
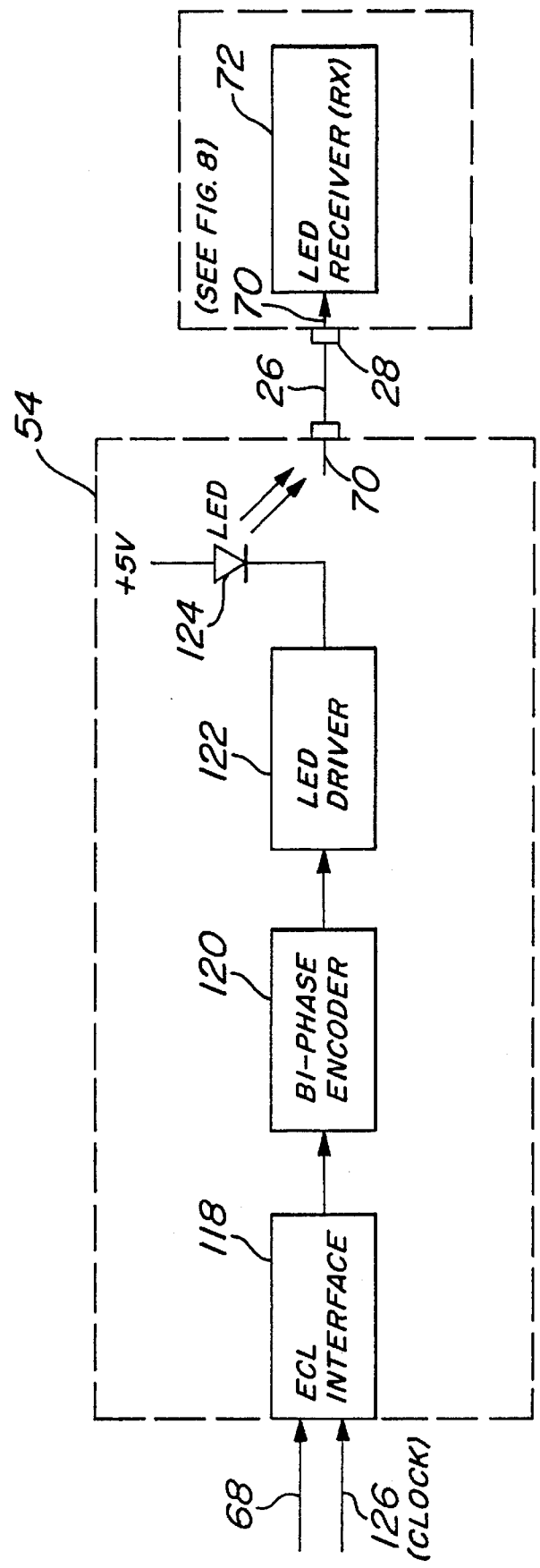
FIG. 9 illustrates further details of the LED transmitter (TX) of FIG. 7.

As seen in FIG. 9, the LED transmitter (TX) 54 comprised of conventional elements 118, 120, 122 and 124, receives the clock signal on path 126 which is routed to an ECL interface device 118 which also receives the ECL data on signal path 68. The ECL interface device 118 routes the data and clock to a bi-phase encoder 120 which encodes, in a manner as previously described, the clock and data signals for transmission using Manchester Bi-phase coding techniques and provides corresponding output signals to LED drive 122 which, in turn, provides a current output to directly drive LED device 124. The LED device 124 provides light signal representative of the encoded clock and data signals which are routed to LED receiver (RX) 72 by way of the fiber optical cable 26. The LED receiver (RX) 72, the ECL amplifier 74 and the decoder all of FIG. 8 may be further described with reference to FIG. 10.

Figure 10:
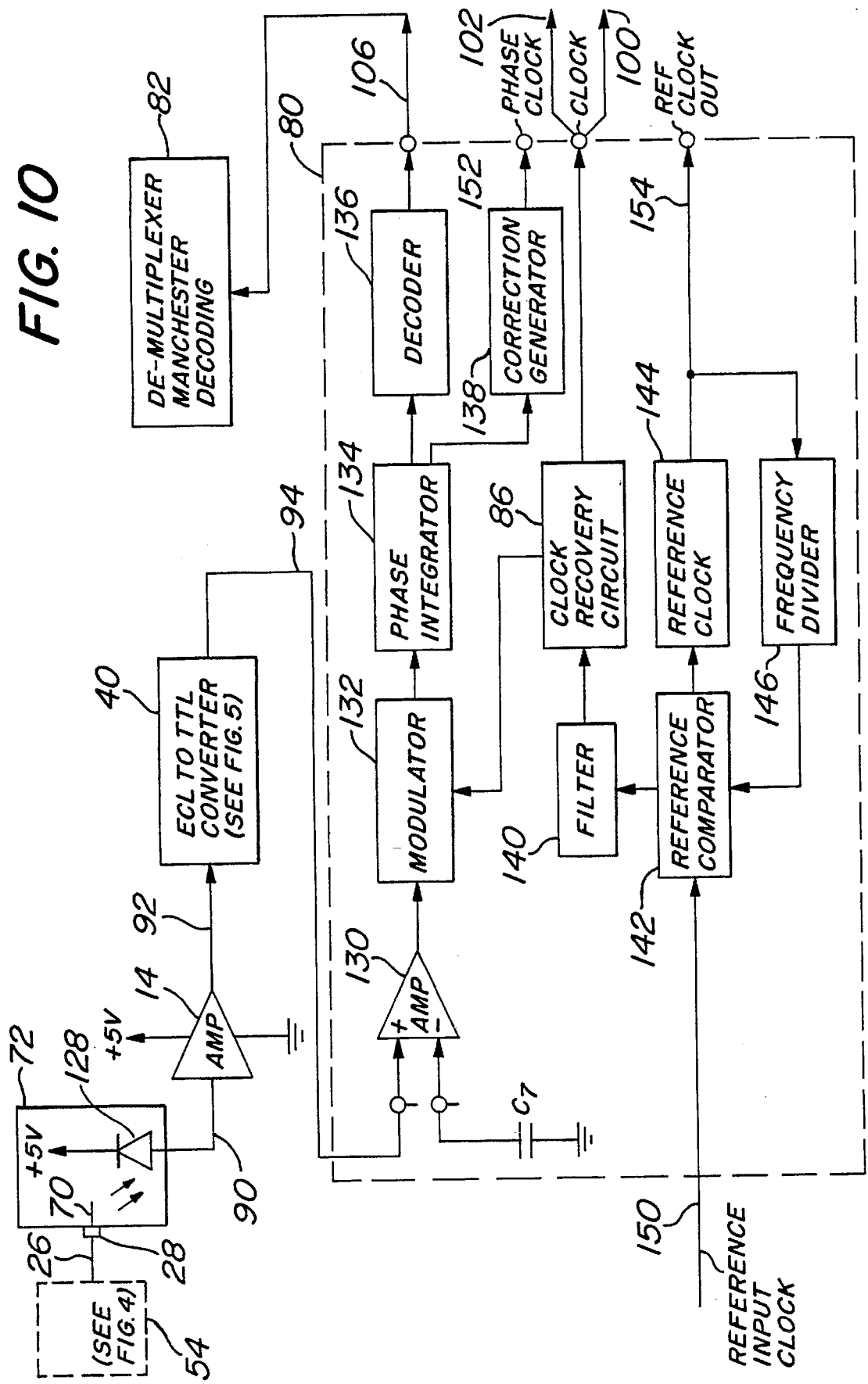
FIG. 10 illustrates further details of the decoder of FIG. 8.

As seen in FIG. 10, the LED receiver (RX) 72 has a PIN diode which provides a voltage suitable for driving the ECL amplifier arranged as shown. As previously discussed with reference to FIG. 8, the ECL amplifier 74 provides output signals that are routed, via signal path 92, to the ECL to TTL converter 40 which, in turn, provide corresponding signals to the decoder 80 comprising conventional elements, arranged as shown in FIG. 10, and tabulated in Table 5.

TABLE 5

| REFERENCE NO. | ELEMENT |
|---|---|
| 130 | DIFFERENTIAL AMPLIFIER |
| 132 | MODULATOR |
| 134 | PHASE INTEGRATOR |
| 136 | DECODER |
| 138 | CORRECTION GENERATOR |
| 140 | FILTER |
| 142 | REFERENCE COMPARATOR |
| 144 | REFERENCE CLOCK |
| 146 | FREQUENCY DIVIDER |
| $C_7$ | CAPACITOR HAVING A TYPICAL VALUE OF 0.1 UF |

The decoder 80 cooperates with the clock recovery circuit 86 (shown within decoder 80), in a manner as previously described with reference to FIG. 8, to recover the clock from the data stream and also decodes the Manchester coded data. The clock output is applied to signal paths output 100 and 102, previously discussed with reference to FIG. 8, and the decoded data is applied to the de-multiplexing Manchester decoding 82, via signal path 106 both also previously discussed with reference to FIG. 8. In addition to these data and clock signals, the decoder 80 also receives a reference input clock on signal path 150 and generates, in a manner known in the art, reference clock output signals and phase clock output signals on signal paths 152 and 154, respectively, which may serve useful timing functions in merging the NTDS computers 12 and 14 of FIG. 1.

It should now be appreciated that the practice of the present invention provides for a coupler device, such as 20A, 20B, 20C and 20D, each housing a circuitry that generates and responds to visual output signals derived from a first protocol and generates and responds to first protocol signals derived from visual input signals so that the circuitry, along with fiber optic cables, provides for optical communications between first and second digital equipment each having a first protocol, such as the NTDS protocol found on military equipment.

It should be further appreciated that the practice of the present invention converts the signals from a first protocol to a second protocol which is of the popular transistor/transistor logic (TTL) logic levels which, in turn, is converted to the emitter coupled logic (ECL) that accommodates the high speed desired for optical links.

Although the hereinbefore given description was related to a first protocol of an NTDS type, a second protocol of a TTL type, and a third protocol of a ECL type, other types of protocols are contemplated and may be implemented by the practice of the present invention in a manner as hereinbefore described.

Obviously, many modifications and variations of the present invention are possible in light of the foregoing teachings. It is, therefore, to be understood that within the scope of the appended claims, the invention may be practiced otherwise than as specifically described.

What I claim is:

1. A coupler device housing circuitry that generates visual output signals in response to signals derived from a first protocol, and conversely, generates first protocol signals derived from visual input signals, said circuitry providing optical communications between first and second digital equipment having said first protocol comprising signals made available at a first connector of each first and second digital equipment, said coupler device comprising:
   (a) first means including a first cable connector having predetermined dimensions for connecting to said first connector at said first digital equipment, said first means routing input signals defined by said first protocol to said circuitry which, in turn, generates visual output light signals;
   (b) a fiber optical cable having a first end for receiving said visual output light signals and a second end making available said visual output light signals;
   (c) second means including a second cable connector having predetermined dimensions for connecting to said first connector at said second digital equipment and for receiving said made available visual output signals and routing them to said circuitry which, in turn, generates first protocol signals;
   (d) a first ring device having dimensions slightly greater than those of said first cable connector of said first means and of said first connector of said first digital device so that said first ring device fits over, straddles, and presses against said first cable connector of said first means and said first connector of said first digital device, and
   (e) a second ring device having dimensions slightly greater than those of said second cable connector of said second means and of said first connector of said second digital device so that said second ring device fits over, straddles, and presses against said second cable connector of said second means and said first connector of said second digital device.

2. A circuit providing optical communication between first and second digital equipment each having a first protocol and connected therebetween by an optical fiber cable having respective first and second ends, said first protocol comprising two or more lines all of which carry data at the same time and each of said data being represented by a first set of logic levels, said circuit comprising:
   (a) a first converter having means for receiving said data of said first protocol of said first digital equipment and converting said data of said first protocol having said first set of logic levels to a second set of logic levels corresponding to that of a second protocol and providing an output thereof;
   (b) a second converter receiving the output of said first converter and converting said data of said first protocol to a third set of logic levels corresponding to that of a third protocol and providing an output thereof;
   (c) a third converter receiving the output of said second converter and converting said data of said first protocol being carried on two or more lines into sequential data carried on one line and providing an output thereof;
   (d) a device receiving the output of said third converter and emitting visible light in response to said sequential data and providing an output thereof which is applied to said first end of said optical fiber cable;
   (e) a device located at the second end of said optical fiber cable for receiving and being responsive to the visible light of said sequential data to provide corresponding data having logic levels of said third protocol and providing an output thereof;
   (f) a fourth converter receiving the output of said device located at said second end of said optical fiber and converting said sequential data at said corresponding logic levels of said third protocol to data having said logic levels corresponding to that of said second protocol;
   (g) a fifth converter receiving the output of said fourth converter and converting said sequential data carried on one line to data defined by said first protocol carried on two or more lines and providing an output thereof; and
   (h) a sixth converter receiving said output of said fifth converter and converting said data of said first protocol having said second set of logic levels to that of said first protocol defined by said first set of logic levels.

3. The circuit according to claim 2, further comprising a first amplifier interposed between said device located at the second end of said optical fiber and said fourth converter and acting to increase the magnitude of the sequential data at the output of said device located at the second end of said optical fiber.

4. The circuit according to claim 2, wherein the logic levels of said first, second and third protocols respectively correspond to those of a Naval Tactical Data System (NTDS), Transistor-Transistor Logic (TTL) and Emitter Coupled Logic (ECL).

5. The circuit according to claim 2, wherein said third converter comprises:
   (a) a multiplexer receiving said output of said second converter comprising two or more lines all of which carry data at the same time and placing such data onto a single line serving a the output thereof;

(b) an encoder receiving the output of said multiplexer and providing a signal comprising a composite manchester coded message having a clock signal embedded therein and serving as the output thereof; and (c) a signal processor receiving the composite output signal of said encoder and providing a time division multiplexed output servicing as said output of said third converter.

6. The circuit according to claim 5, wherein said fifth converter comprises:

(a) a circuit receiving the output of said fourth converter comprising said time division multiplexed output and recovering the clock embedded therein and which clock serves as the output thereof;

(b) a decoder receiving the clock output of said recovery circuit and the output of said fourth converter comprising said time division multiplexed output, said decoder decoding said time division multiplexed output to recover said composite manchester coded message which serves as the output thereof;

(c) a circuit receiving the output of said decoder and converting said composite manchester coded message carried on a single line to corresponding data line carried on two or more lines, said converted data being in groups separated from each other by a predetermined duration in response to timing signals, said converted data serving as the output of said fifth converter; and (d) one or more frequency dividers receiving the clock output of said recovery circuit and generating said timing signals applied to said circuit receiving the output of said decoder.

7. The circuit according to claim 2, wherein each of said devices receiving the output of said third converter and located at the second end of said optical fiber cable comprises a light emitting diode (LED).

8. The circuit according to claim 2, further comprising a storage device receiving the output of said first converter, said storage device being selected from one of an electrically programmable read only memory (EPROM), a random access memory (RAM), a read only memory (ROM) and first-in, first-out (FIFO) register.

9. The circuit according to claim 2, further comprising a storage device receiving the output of said fifth converter, said storage device being selected from one of an electrically programmable read only memory (EPROM), a random access memory (RAM), a read only memory (ROM) and first-in, first-out (FIFO) register.

* * * * *